United States Patent
Voutsas

(10) Patent No.: US 6,580,053 B1
(45) Date of Patent: Jun. 17, 2003

(54) APPARATUS TO CONTROL THE AMOUNT OF OXYGEN INCORPORATED INTO POLYCRYSTALLINE SILICON FILM DURING EXCIMER LASER PROCESSING OF SILICON FILMS

(75) Inventor: Apostolos Voutsas, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 19 days.

(21) Appl. No.: 09/653,484

(22) Filed: Aug. 31, 2000

(51) Int. Cl.[7] .................. B23K 26/00; B23K 26/14; B23K 26/16

(52) U.S. Cl. .............. 219/121.66; 219/121.6; 219/121.67; 219/121.68; 219/121.69

(58) Field of Search .............. 219/121.66, 121.6, 219/121.67, 121.69, 121.71, 121.75

(56) References Cited

U.S. PATENT DOCUMENTS

| | | | |
|---|---|---|---|
| 5,064,520 A | * 11/1991 | Miyake et al. ........ 204/192.11 |
| 5,147,826 A | 9/1992 | Liu et al. ................ 437/233 |
| 5,182,231 A | * 1/1993 | Hongo et al. ............ 438/598 |
| 5,298,717 A | * 3/1994 | DeRossett, Jr. ........ 219/121.68 |
| 5,309,925 A | * 5/1994 | Policastro ................ 128/849 |
| 5,383,217 A | * 1/1995 | Uemura ................ 372/29.02 |
| 5,409,802 A | * 4/1995 | Sato et al. ................ 216/63 |
| 5,519,486 A | * 5/1996 | Baird et al. ............. 356/35.5 |
| 5,591,988 A | * 1/1997 | Arai et al. ............... 257/291 |
| 5,655,832 A | * 8/1997 | Pelka et al. .............. 362/259 |
| 5,659,479 A | * 8/1997 | Duley et al. .............. 700/166 |
| 5,746,844 A | * 5/1998 | Sterett et al. ............. 148/522 |
| 5,748,222 A | * 5/1998 | Roberts .................. 417/414 |
| 5,773,329 A | 6/1998 | Kuo ..................... 438/162 |
| 5,780,806 A | * 7/1998 | Ferguson et al. ............ 134/1 |
| 5,830,538 A | * 11/1998 | Gates et al. ............ 427/248.1 |
| 5,938,954 A | * 8/1999 | Onuma et al. .......... 219/121.6 |
| 6,027,960 A | * 2/2000 | Kusumoto et al. ......... 438/166 |
| 6,071,796 A | * 6/2000 | Voutsas ................ 438/166 |
| 6,074,135 A | * 6/2000 | Tapphorn et al. .......... 406/134 |
| 6,108,189 A | * 8/2000 | Weldon et al. ............ 279/128 |
| 6,187,616 B1 | * 2/2001 | Gyoda .................. 438/151 |
| 6,258,173 B1 | * 7/2001 | Kirimura et al. .......... 118/718 |
| 6,270,619 B1 | * 8/2001 | Suzuki et al. ............. 118/19 |
| 2001/0003697 A1 | * 6/2001 | Jennings et al. ............ 451/36 |
| 2002/0094008 A1 | * 7/2002 | Tanaka .................. 372/100 |
| 2002/0157608 A1 | * 10/2002 | Nakano et al. ..... 118/723 MW |

FOREIGN PATENT DOCUMENTS

| | | | |
|---|---|---|---|
| DE | 3923829 A1 | * | 1/1991 |
| JP | 6-106374 A | * | 4/1994 |
| JP | 9-102467 A | * | 4/1997 |

OTHER PUBLICATIONS

Article entitled, "Grain Growth in Laser Dehydrogenated and Crystallized Polycrystalline Silicon for Thin Film Transistors", by P. Mei, J.B. Boyce, M. Hqack, R. Lujan, etc., published in J. Appl. Phys. 76 (5), Sep. 1, 1994, pp. 3194–3199.

(List continued on next page.)

Primary Examiner—Tom Dunn
Assistant Examiner—L. Edmondson
(74) Attorney, Agent, or Firm—Matthew D. Rabdau; David C. Ripma; Scott C. Kriegger

(57) ABSTRACT

The invention provides an apparatus for reducing, or eliminating, ambient air in connection with an excimer laser annealing process. Nozzles are provided to direct a flow of gas, preferably helium, neon, argon or nitrogen, at a region overlying the target area of an amorphous silicon layer deposited on an LCD substrate. The nozzles direct a flow of gas at sufficient pressure and flow rate to remove ambient air from the region overlying the target area. With the ambient air, especially oxygen, removed, the laser can anneal the amorphous silicon to produce polycrystalline silicon with less oxygen contamination. In a preferred embodiment, an exhaust system is also provided to remove the gas.

17 Claims, 3 Drawing Sheets

OTHER PUBLICATIONS

Article entitled, "Surface Roughness Effects in Lawser Crystallized Polycrystalline Silicon", by D.J. McCulloch and S.D. Brotherton, published in Apply. Phys. Letter 66 (16), Apr. 17, 1995, pp. 2060–2062.

Article entitled, "Comprehensive Study of Lateral Grain Growth in Poly–Si Films by Excimer Laser Annealing and Its Application to Thin Film Transistors", by H. Kuriyama et al., published in Jpn. J. Appl. Phys. vol. 33 (1994) pp. 5657–5662.

Article entitled, Excimer–Laser–Annealed Poly–Si Thin–Film Transistors by S.D.Brotherton, D.J. McCullock, J.B. Clegg and J.P. Gowers, published in IEEE Transactions on Electron Devices, vol. 40, No. 2, Feb., 1993, pp 407–413.

Article entitled, "Effects of Oxygen on Crystallization of Amorphous Silicon Films and Polysilicon TFT Characteristics" by Yong–Min Ha, Seong–Hoon Lee, Chul–Hi Han and Choong–Ki Kim, published in Journal of Electronic Materials, vol. 23, No. 1, 1994, pp 39–45.

Article entitled, "Oxygen effect on the electrical characteristics of polycrystalline silicon films", by R. Angelucci, L. Dori and M. Severi, published in Appl. Phys. Lett. 39 (4), Aug. 1981, pp 346–348.

Article entitled, "Inverse Staggered Poly–Si and Amorphous Si Double Structure FT's for LCD Panels with Peripheral Driver Circuits Integration", by T. Aoyama, K. Ogawa, Y. Mochizuki and N. Konishi, published in IEEE Transactions on Electron Devices, vol. 43, No. 5, May 1996, pp 701–705.

Article entitled, "Characteristics of Excimer Laser Annealed Polysilicon Films for Application in Polysilicon Thin FIml Transistor Devices", by Tolis Voutsas, Aaron Marmorstein and Raj Solanki, published in SPIE vol. 3014, pp 112–118.

* cited by examiner

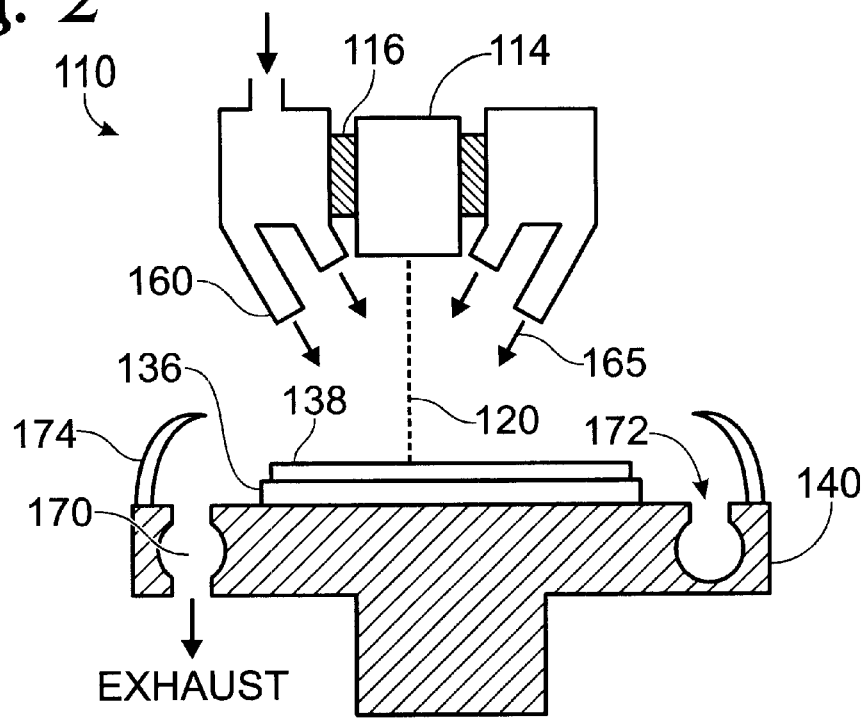
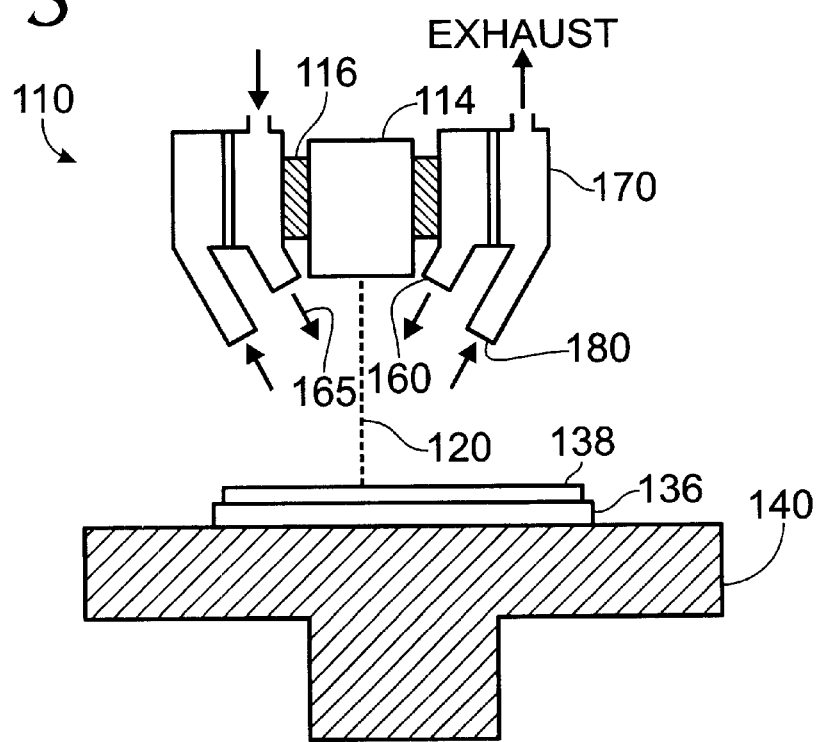

APPARATUS TO CONTROL THE AMOUNT OF OXYGEN INCORPORATED INTO POLYCRYSTALLINE SILICON FILM DURING EXCIMER LASER PROCESSING OF SILICON FILMS

BACKGROUND OF THE INVENTION

The invention relates generally to flat panel display manufacturing systems and more particularly to an apparatus for preparing polycrystalline silicon films on flat panel display substrates.

Thin film transistors (TFTs) used in liquid crystal displays (LCDs) or flat panel displays of the active matrix display type are fabricated on silicon films deposited on a transparent substrate. The most widely used substrate is glass. Amorphous silicon is readily deposited on glass. Amorphous silicon limits the quality of TFT that can be formed. If driver circuits and other components are to be formed on the display panel, as well as switches associated with each pixel, crystalline silicon is preferred.

Amorphous silicon can be crystallized to form crystalline silicon by solid-phase crystallization. Solid-phase crystallization is carried out by high temperature annealing. But, glass substrates cannot withstand the temperatures necessary to melt and crystallize silicon. Quartz substrates can withstand high temperature annealing, but quartz substrates are too expensive for most LCD applications.

Because glass deforms when exposed to temperatures above 600° C., low-temperature crystallization (preferably below 550° C.) is used for solid-phase processing of silicon on glass. The low-temperature process requires long anneal times (at least several hours). Such processing is inefficient and yields polycrystalline silicon TFTs that have relatively low field effect mobility and poor transfer characteristics. Polycrystalline silicon produced by solid-phase crystallization of as-deposited amorphous silicon on glass suffers due to small crystal size and a high density of intragrain defects in the crystalline structure.

Excimer laser annealing (ELA) has been actively investigated as an alternative to low-temperature solid-phase crystallization of amorphous silicon on glass. In excimer laser annealing, a high-energy pulsed laser directs laser radiation at selected regions of the target film, exposing the silicon to very high temperatures for short durations. Typically, each laser pulse covers only a small area (several millimeters in diameter) and the substrate or laser is stepped through an exposure pattern of overlapping exposures, as is known in the art. More powerful lasers with larger beam profiles are now available or are under active development, reducing the number of exposures required. Regardless of the number and pattern of exposures, ELA allows areas of amorphous film to be crystallized without damaging the underlying glass substrate.

The major advantages of ELA are the formation of polycrystalline grains with excellent structural quality and the ability to process selected areas of a display panel. Polycrystalline silicon produced on transparent substrates by ELA has electron mobility characteristics rivaling IC driver circuits currently mounted along the edges of the screen. Thus, it becomes possible to incorporate driver circuitry onto the substrate, simplifying manufacturing.

The most common problem that plagues ELA is the narrow process window associated with the development of large and uniform grain sizes. Surface roughness inherent to the process is also troublesome. Research has suggested that improvements in surface conditions, a reduction in defects, and increased crystal size are associated with low oxygen content ELA polycrystalline silicon films. Oxygen content can be controlled in several ways. The industry standard currently being used is to perform ELA in a high vacuum ($10^{-7}$ Torr), or somewhat less efficacious, in a rough vacuum ($10^{-3}$ Torr). Alternatively, ELA has been carried out in chambers filled with non-oxygen ambient gases such as He, Ar, or N with varying results. The association between oxygen content and polycrystalline silicon film quality is still being investigated.

A significant problem with prior art systems for reducing oxygen incorporation into polycrystalline silicon during ELA is the need for a process chamber to house the target substrate. When a process chamber (alternatively called: "chamber", "processing chamber", or "substrate isolation chamber") is used, the beam of the excimer laser must pass into the chamber through a quartz window. Vacuum chambers, in particular, are costly. Chambers for processing in non-air ambient at atmospheric pressure are somewhat simpler than vacuum chambers, but still have quartz windows. The quartz windows cost several thousand dollars and have only a limited life, lasting only days or weeks in volume production. The cost associated with a processing chamber is one reason ELA equipment without substrate isolation is still being manufactured, sold and used. The despite evidence that ELA performed in air ambient produces polycrystalline silicon with inferior mobility characteristics (and a higher oxygen content) compared with films annealed in non-air ambient.

It would be advantageous to be able to effectively control the amount of oxygen incorporated in ELA polycrystalline silicon films, keeping the oxygen content below a predetermined threshold, while minimizing the cost of production.

It would be advantageous to have ELA equipment that would reduce, or eliminate, oxygen from the target area without the need for an isolation chamber.

It would also be advantageous to improve the quality of ELA polycrystalline silicon films on flat panel display substrates by reducing oxygen incorporation with relatively simple changes to ELA equipment.

It would also be advantageous if existing equipment could be modified to reduce, or eliminate, oxygen from the target area without the need for an isolation chamber.

SUMMARY OF THE INVENTION

Accordingly, a laser annealing apparatus for forming polycrystalline silicon film on substrates using ELA is provided. The laser annealing apparatus of the present invention comprises a laser for directing a beam to a location on the surface of a semiconductor material. A nozzle, or plurality of nozzles, is positioned to direct a flow of gas over the location on the surface of the semiconductor material. The gas is preferably helium, neon, argon or nitrogen. The gas removes ambient air, especially oxygen, from the location on the surface of the semiconductor material. This allows the laser to anneal the semiconductor material in an atmosphere with reduced oxygen, or preferably no oxygen. The absence of oxygen allows the laser to produce a higher quality polycrystalline region within the semiconductor material.

The apparatus is adapted to be retrofit to existing ELA systems. It can be mount to a laser head or to a moveable base upon which the semiconductor material is placed.

The apparatus will preferably include an exhaust system to aid in removing the gas and ambient air.

In one preferred embodiment of the apparatus, a shroud is provided to surround a laser beam produced by the laser. The shroud incorporates an air path for the gas flow to the nozzle as well as an exhaust port. In a further embodiment, the shroud is partially sealed to the base supporting the semiconductor material forming an enclosure. The shroud is preferably flexible to allow for the movement of the base. The flexibility is preferably provided by a flex region.

BRIEF DESCRIPTION OF THE DRAWINGS

FIG. 2 is a schematic cross-sectional view showing an ELA system with gas flow nozzles mounted to a laser along with an exhaust system for removing ambient air from a target region according to an embodiment of the present invention.

FIG. 3 is a schematic cross-sectional view showing an ELA system with gas flow nozzles and an exhaust system mounted to a laser for removing ambient air from a target region according to an embodiment of the present invention.

DETAILED DESCRIPTION OF THE INVENTION

Figure 1:
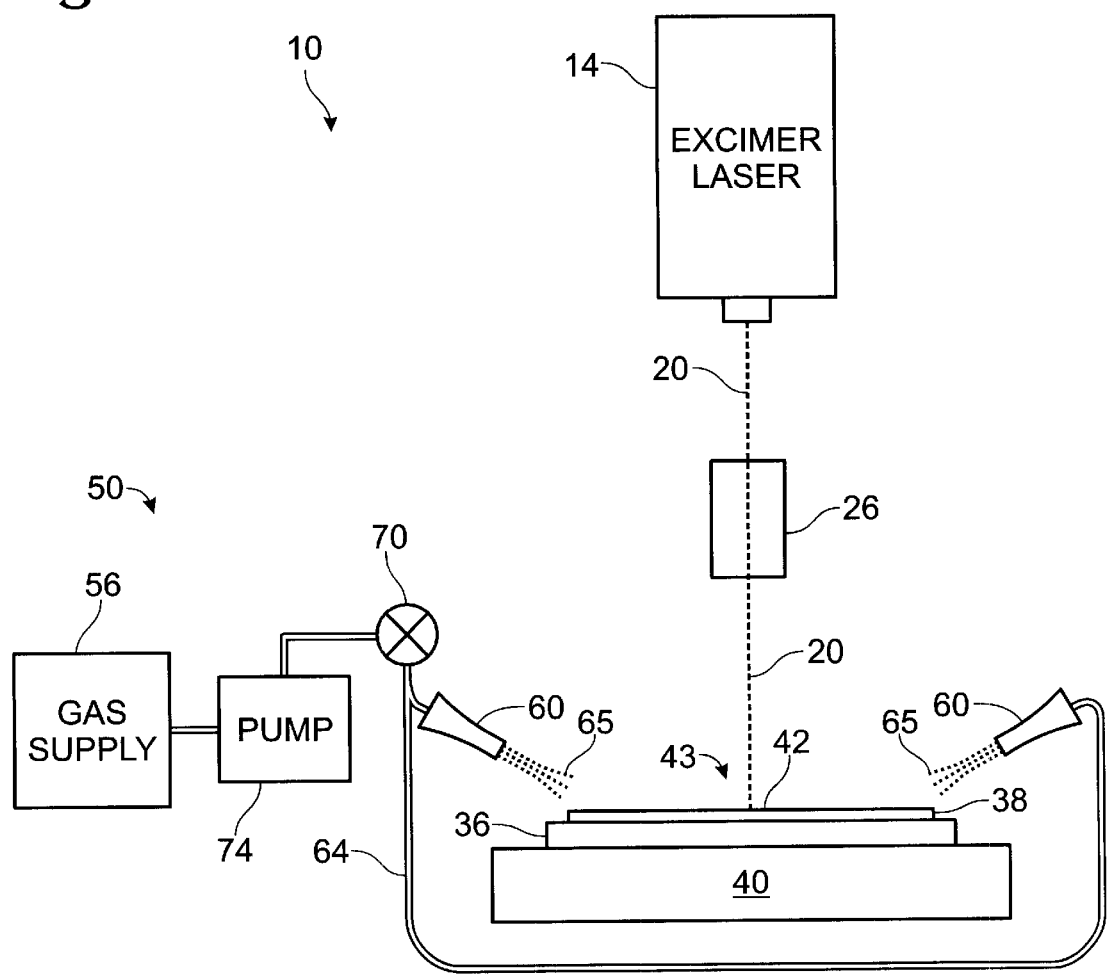
FIG. 1 is a schematic cross-sectional view showing an ELA system with gas flow nozzles for removing ambient air from a target region according to an embodiment of the present invention.

FIG. 1 is an illustration of the components of an excimer laser annealing (ELA) apparatus 10. Several manufactures supply excimer lasers suitable for use with the present apparatus, including Sopra, S.A. of France, and Lambda Physik of Germany. Excimer lasers and related systems are well known to those skilled in the ELA art.

Excimer laser annealing apparatus 10 includes a laser head 14, which emits high-energy coherent optical radiation at a selected wavelength. The type of laser used is a matter of design choice. For example, XeCl lasers emit UV radiation at a wavelength of 308 nm; KrF lasers operate at a wavelength of 248 nm. Laser 14 emits a pulsed beam 20 that is adjustable to various power levels. Pulse durations can be varied over a wide range, typically between 10 and 200 ns, and the pulse repetition rates are generally selectable between 0.1 Hz and 300 Hz. Beam cross-sections can vary widely depending on the power level of the laser and the type of optics used in the apparatus.

Laser 14 emits beam 20 that passes through a beam homogenizer 26. The beam homogenizer is an optical system that produces a substantially uniform beam profile as it strikes a target surface. The size of beam 20 as it emerges from homogenizer 26, and any other optics (not shown), determines the size and configuration of the target area on the substrate, which will be irradiated by laser beam 20. Beam profiles vary substantially from typical beams of between 10 and 50 mm$^2$ up to so-called single shot ELAs capable of annealing entire flat panel displays in a single exposure. Currently, the flat panel displays that can be annealed in a single shot are smaller than standard display sizes.

Laser beam 20 is directed at a flat panel display substrate 36 onto which a layer of amorphous silicon film 38 has previously been deposited. Substrate 36 is supported in apparatus 10 on a movable stage 40 of any suitable type capable of repositioning substrate 36 in a programmable manner to ensure that target regions 43 (where beam 20 strikes film 38) on the substrate are sequentially or repeatedly irradiated. It will, of course, be readily understood that the function of movable stage 40 could alternatively be accomplished by moving laser head 14 to aim at different target regions 43 on the substrate 36. Whichever way the function is accomplished, the purpose of the ELA apparatus 10 is to expose selected areas of the film 38 to excimer laser energy by irradiating one or more target regions 43.

The power level of laser 14, the duration of the laser pulse emitted, the size of laser beam 20, and the degree of overlap between successive exposures will determine the number of exposures or "shots" to which each target region on substrate 36 is exposed. ELA systems are readily programmed to perform multiple exposures, sometimes 100 exposures, or more, on each sub-region or target area of the substrate, in order to properly anneal and crystallize the amorphous silicon film. The present invention is not limited to any specific laser annealing parameters and can be readily used with excimer lasers of any suitable power level.

A particular advantage of the present invention is that ELA apparatus 10 does not require an environmental chamber, or similar sealed enclosure, surrounding substrate 36. Prior art systems have utilized chambers that were generally designed to be evacuated to either a high or a rough vacuum. Alternatively, the chamber has been used to provide a controlled atmosphere within the chamber. In ELA systems that include such environmental chambers, beam 20 from laser 14 enters the chamber through a suitable window. Due to the wavelength of the lasers used, the window is typically a quartz window. The present invention provides for a system that reduces, or eliminates, the need for an environmental chamber. The elimination of the chamber will also eliminate the need for the window and other equipment associated with the chamber.

Instead of the chamber, the present apparatus can be used in a conventional LCD-processing cleanroom environment. With the chamber eliminated, the apparatus 10 should provide a means for controlling the atmosphere over target region 43.

One embodiment of the apparatus is shown in FIG. 1. The ELA apparatus 10 includes a gas supply system 50 for directing gas onto the surface of the silicon film 38 on substrate 36. Gas supply system 50 includes one, or more, reservoirs 56 of a suitable gas, preferably argon, neon, helium or nitrogen. The reservoir 56 can contain a liquefied gas if fitted with a suitable vaporizer, or it can contain pressurized gas.

Gas supply reservoir 56 is operatively connected to one, or more, nozzles 60 through suitable manifolds or conduits 64 that deliver gas to target region 43 on substrate 36. One, or more, valves 70 are preferably provided to control the flow of gas from reservoir 56 to nozzles 60. Although in a preferred embodiment a high pressure gas supply tank will be used, it is also possible to use a pump and still be within the scope of the present invention. According, a pump 74 is shown. The number, shape, size, and configuration of nozzles 60 is a matter of design choice and optimization. The nozzles can take a variety of forms such as showerheads, multiple individual nozzles, or elongated laminar flow apertures. The nozzles will preferably be adjustable in orientation to direct the gas flow to the desired location. The adjustability is preferably accomplished using ball-type nozzles, flexible tubing and brackets, or bendable nozzle ends. The method of adjusting the nozzle direction is not critical to the present invention.

The purpose of the gas supply 50 is to direct a gas flow 65 across, or onto, surface 42 above target region 43 of silicon film 38 during irradiation of target region 43 by laser beam 20. Gas flow 80 displaces the ambient atmosphere from the environment of target region 43 during one or more exposures to the laser beam 20.

In the preferred embodiment shown in FIG. 1, nozzles 60 are located in the area of the movable stage 40. The nozzles can be mounted to the movable stage 40 so that nozzles 60 move with the stage, thereby remaining stationary relative to the substrate 36. Alternatively, the nozzles can be mounted near the stage, but not attached to it, so that when the stage moves the gas flow 80 remains fixed. By fixing the gas flow, while the stage moves, the gas flow can be oriented more precisely over the target region 43.

Gas flow 80 should be of sufficient volume and flow rate to remove a significant portion of the ambient air, and particularly the oxygen, from the target region 43. The term "remove" is intended to convey the reduction, or elimination, of ambient air, especially oxygen from the target region. The amount of oxygen present at the surface should be reduced to the point where it will not affect the polycrystalline silicon being formed during any laser annealing steps. To determine the appropriate range for the gas flow 80, the volume of air that is to be displaced, and replaced with argon, neon, helium or nitrogen, along with the time allowed for operation, should be considered. The time period for the displacement of the air volume should be determined by the laser discharge frequency. The displacement process should take place within successive laser shots. For example, if the laser operates at 100–300 Hz, the time between successive shots is 3.3–10 milliseconds. The displacement volume can be simply estimated by the product of the area covered by the laser beam times the thickness of the region of desired gas on top of the irradiated surface. This thickness is preferably minimized to minimize the displaced volume of ambient air. However, it should be a sufficiently thick region to effectively inhibit diffusion of oxygen from the ambient air to the surface of the irradiated area.

For example, the diffusion coefficieint of $O_2$ through a stagnant layer of $N_2$ is estimated as: $D_{O2-N2}=0.18$ cm²/s. The diffusion length of $O_2$ atoms through a region of nitrogen can be estimated by: $1=\sqrt{(D_{O2-N2}\cdot t)}$; where 1 is the diffusion length and t is the time allowed for the diffusion process. Solving for the diffusion length using the diffusion coefficient provided above, and setting t equal to the time between successive laser shots (0.01 seconds), an upper limit for the diffusion length can be estimated as 0.3 mm. This means that oxygen at a concentration comparable to ambient air will diffuse through a depth of 0.3 mm of nitrogen gas over the target region. By providing a nitrogen gas flow to a thickness over the target region of three times this estimated diffusion length it should be possible to ensure that the interface between the irradiated target region and the region of nitrogen will be virtually oxygen free. Thus the preferred thickness of nitrogen is estimated as approximately three times the diffusion length of oxygen through nitrogen, or 1 mm.

As a minimum, the area flooded by the nozzles needs to be equal to the area of the laser beam. However, the area flooded by the nozzles is preferably three to five times the area of the laser beam. A typical laser beam is 7.5 cm×1.2 cm. So, preferably the volume of ambient air, and corresponding volume of nitrogen, is 2.7–4.5 cm³ (or 2.7–4.5 ml).

Although the above discussion related to nitrogen as the preferred gas, the amount of gas flow needed to displace ambient air can be readily calculated for other desired gases, including helium, neon and argon.

Referring now to FIG. 2, an apparatus 110, which is an alternative embodiment of this invention, is shown in cross-section. A laser head 114, which is preferably cylindrical, is provided incorporating a laser, a homogenizer, and other optics, if any (not shown). Laser head 114 may also be referred to generally as the laser. Laser head 114 directs a laser beam 120 at a flat panel display substrate 136 onto which a layer of amorphous silicon film 138 has previously been deposited. Substrate 136 is supported on a moveable stage 140 of any suitable type capable of repositioning substrate 136 in a programmable manner to ensure that target regions 143 (where beam 120 strikes film 138) may be selected as desired.

In a preferred embodiment of the present invention, at least one nozzle 160, and preferably nozzles, mounts to laser head 114. The nozzle is attached to the laser head through an attachment block 116, which preferably seals the nozzles to the laser head. Mounting to laser head 114 is preferable as it provides consistent alignment of a gas flow 165 with laser beam 120. Nozzle 160 is connected to a gas reservoir, and valve system as described above in connection with FIG. 1. The optional pump may also be included.

In one embodiment of the present invention, gas flow 165 eventually dissipates into the surrounding ambient environment.

In another embodiment of the present invention, an exhaust system 170 is provided. As shown in FIG. 2 the exhaust system 170 is incorporated into stage 140. Exhaust system 170 is formed by apertures 172 in stage 140 connected to an exhausting pump (not shown). Preferably, a baffle 174 is provided to direct the gas into the exhaust system 170.

Referring now to FIG. 3, in another preferred embodiment the apparatus 110 is configured such that the laser beam 120 is directed substantially along the axis of the laser head 114. A ring of nozzles 160 is provided adjacent the laser head 114 for introducing gas flow 165. Exhaust system 170 is formed by a second ring of nozzles 180 mounted outside of ring of nozzles 160. A nozzle that is used as part of the exhaust system is also referred to as an exhaust port. In operation, nozzles 160 will provide gas flow at target region 143 as necessary to reduce, or eliminate oxygen from the target region. The gas flow then exits through exhaust system 170, which is connected to the exhaust pump (not shown).

Although the exhaust system was described above as being mounted outside the ring of nozzles 160, it also possible to mount the exhaust system adjacent the laser, and mount the ring of nozzles 16 outside the exhaust system.

Figure 4:
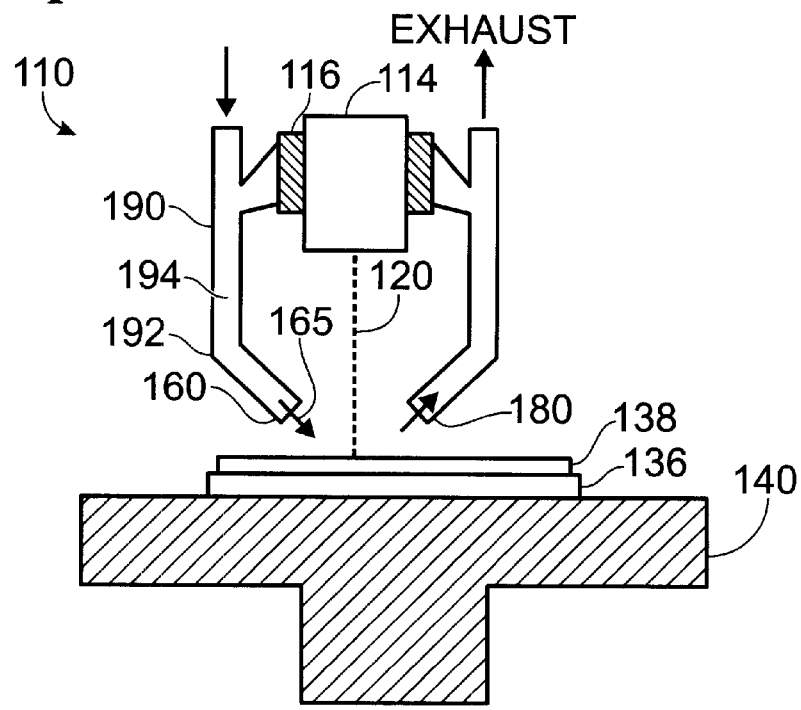
FIG. 4 is a schematic cross-sectional view showing an ELA system with gas flow nozzles further comprising a shroud.

Referring now to FIG. 4, a shroud 190 mounts to laser head 114 and surrounds laser beam 120. In one preferred embodiment, the shroud is rectangular. Nozzles 160 are provided at an end 192 of the shroud and connected to a pump (not shown) by a duct 194. The duct 194 is preferably incorporated into the shroud. In the rectangular configuration, the nozzles 160 preferably provide a flow of gas across the laser beam 120 at the surface 142 of the substrate 136. In a preferred embodiment, a second set of nozzles 180 is connected to an exhaust pump (not shown) to remove the gas from the work area. The shroud allows the gas to be delivered to the area immediately over the surface 142 of the substrate 136 while at least partially enclosing the laser beam 120. This is useful if the distance of the laser head 114 is preferably further from the surface than the preferred gas flow origin.

Figure 5:
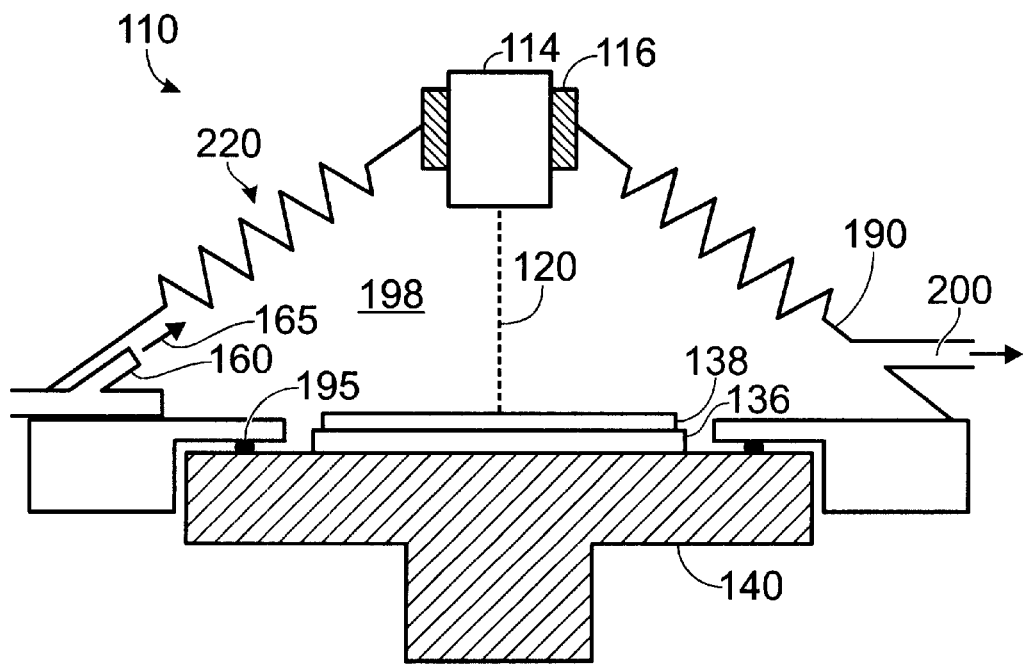
FIG. 5 is a schematic cross-sectional view showing an ELA system with gas flow nozzles further comprising a flexible shroud that forms an enclosure.

Referring now to FIG. 5, another preferred embodiment incorporates a shroud. The shroud 190 attaches to the laser head 114 through an attachment block, or seal, 116. In this embodiment, the shroud 190 rests on the movable base 140. An o-ring 195 is provided to at least partially seal the shroud 190 to the base 140. The combination of the shroud 190 and the base 140 forms a rough enclosure 198. At least one nozzle 160 introduces the gas flow 165 into the enclosure 198. The gas flow 165 can be allowed to exit the chamber through leakage at the edges of the shroud 190, or alternatively through an exhaust port 200.

Since the shroud 190 is in contact with the moveable stage 150, it should to continue to allow the stage to move with impairing its movement. In a preferred embodiment, flex zones 220 are provided to allow the shroud to flex in response to the movement of the stage. The shroud is preferably made of a flexible material, including thin flexible metal, plastic, rubber, or fabric. In another embodiment, only the flex zones 220 should be flexible and the remaining structures can be rigid.

Some of the preferred embodiments of the present invention are adapted to be retrofit onto existing ELA systems without chambers. Accordingly, the apparatus may be provided as components to be mounted to the laser head.

Additional alternative embodiments are possible within the scope of the present invention. Other variations of the apparatus, or materials, within the scope of the present invention will occur to those of ordinary skill in the art. Accordingly, the foregoing disclosure and description thereof are for illustrative purposes only and are not intended to limit the invention. This invention is defined by the claims.

What is claimed is:

1. A laser annealing apparatus for processing a semiconductor material having a surface comprising:
   a) a laser for directing a beam to a location on the surface of the semiconductor material, wherein the semiconductor material is not enclosed within a sealed chamber; and
   b) a nozzle positioned to direct a flow of gas at the location on the surface of the semiconductor material, where the beam is directed, at sufficient pressure to remove ambient air from the location where the beam is directed, wherein the flow of gas is at a flow rate of between approximately 5 and 50 standard liters per minute.

2. A laser annealing apparatus for processing a semiconductor material having a surface comprising:
   a) a laser for directing a beam to a location on the surface of the semiconductor material, wherein the semiconductor material is not enclosed within a sealed chamber;
   b) a nozzle positioned to direct a flow of gas at the location on the surface of the semiconductor material, where the beam is directed, at sufficient pressure to remove ambient air from the location where the beam is directed, and
   c) further comprising an exhaust port.

3. The apparatus of claim 2, further comprising an exhaust pump attached to the exhaust port.

4. The apparatus of claim 2, wherein the exhaust port is formed by an opening in a base, which the substrate rests upon.

5. The apparatus of claim 2, wherein the exhaust port is attached to the laser.

6. The apparatus of claim 2, wherein the exhaust port is adjacent the nozzle.

7. A laser annealing apparatus for processing a semiconductor material having a surface comprising:
   a) a laser for directing a beam to a location on the surface of the semiconductor material, wherein the semiconductor material is not enclosed within a sealed chamber;
   b) a nozzle positioned to direct a flow of gas at the location on the surface of the semiconductor material, where the beam is directed, at sufficient pressure to remove ambient air from the location where the beam is directed; and
   c) further comprising a pump attached to the nozzle for increasing the pressure out of a gas reservoir.

8. A laser annealing apparatus for processing a semiconductor material having a surface comprising:
   a) a laser for directing a beam to a location on the surface of the semiconductor material, wherein the semiconductor material is not enclosed within a sealed chamber; and
   b) a nozzle positioned to direct a flow of gas at the location on the surface of the semiconductor material, where the beam is directed, at sufficient pressure to remove ambient air from the location where the beam is directed; and
   c) further comprising a shroud mounted to the laser.

9. The apparatus of claim 8, wherein in the shroud is flexible and adapted to fit over the substrate and provide an inlet for the gas.

10. The apparatus of claim 8, wherein the shroud is composed of plastic, rubber, metal or fabric.

11. The apparatus of claim 8, wherein a portion of the shroud is corrugated to provide flex.

12. A laser annealing apparatus for processing a semiconductor material having a surface comprising:
   a) a movable base for holding the semiconductor material;
   b) a laser for directing a beam to a location on the surface of the semiconductor material;
   c) a flexible shroud that rests on the moveable base to form an enclosure; and
   d) a nozzle for delivering a flow of gas to the location on the surface of the semiconductor material, whereby ambient air is removed from the location where the beam is directed.

13. The apparatus of claim 12, further comprising an exhaust port.

14. The apparatus of claim 12, wherein the shroud is at least partially sealed to the movable base.

15. The apparatus of claim 12, further comprising a pump attached to the nozzle for increasing the pressure out of a gas reservoir.

16. The apparatus of claim 12, wherein the shroud is composed of plastic, rubber, metal or fabric.

17. The apparatus of claim 12, wherein a portion of the shroud is corrugated to provide flex.

* * * * *